T. S. JOHNSON.
Improvement in Horse-Powers.

No. 132,011. Patented Oct. 8, 1872.

Witnesses:
E. Wolff
N. A. Graham

Inventor:
Thos. S. Johnson
per Munn & Co.
Attorneys.

UNITED STATES PATENT OFFICE.

THOMAS S. JOHNSON, OF WINONA, MISSISSIPPI.

IMPROVEMENT IN HORSE-POWERS.

Specification forming part of Letters Patent No. 132,011, dated October 8, 1872.

*To all whom it may concern:*

Figure 1:
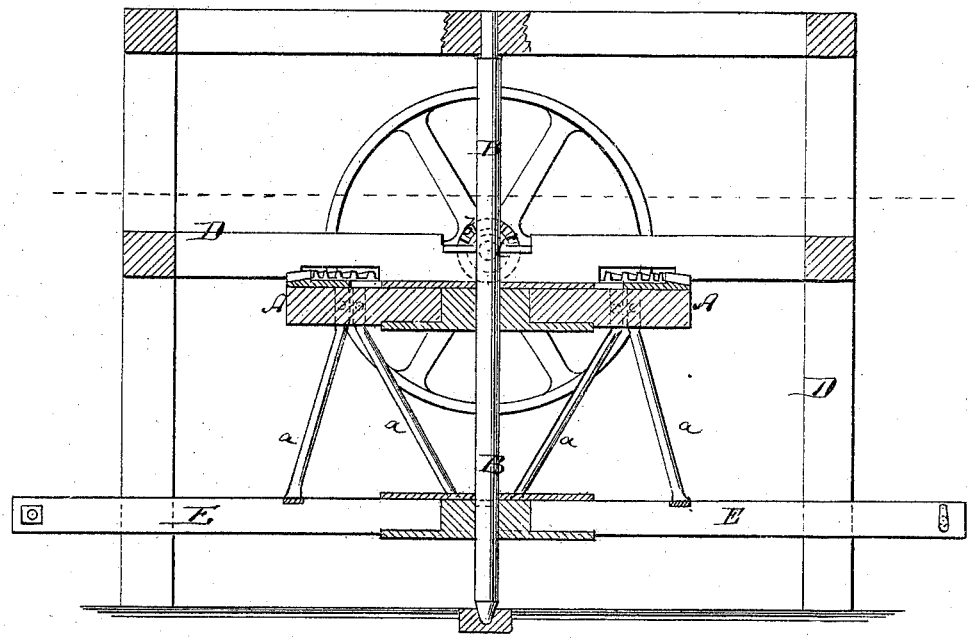
Figure 2:
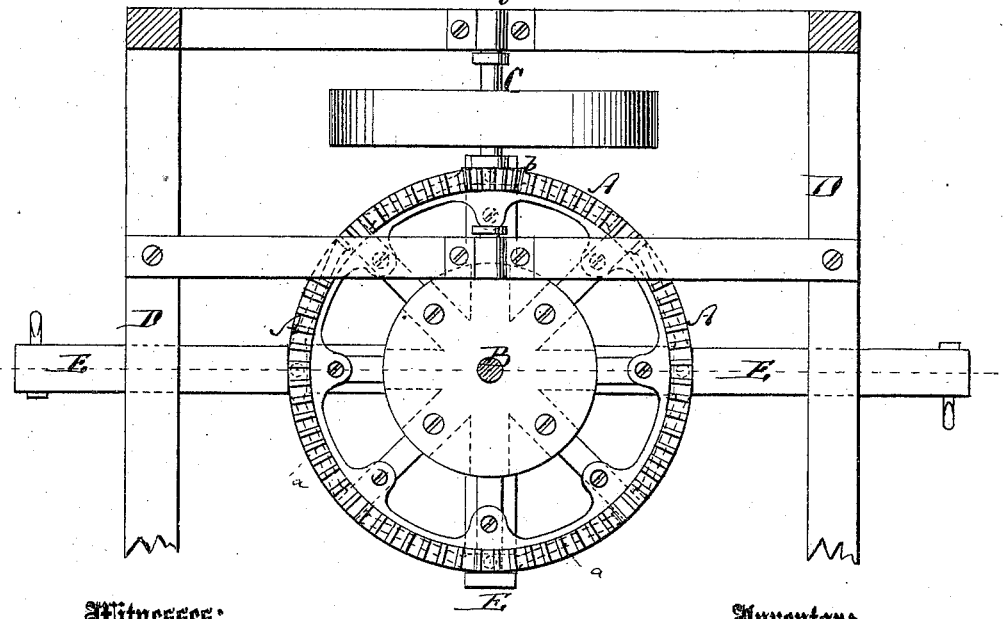

Be it known that I, THOMAS S. JOHNSON, of Winona, Carroll county, State of Mississippi, have invented a new and useful Improvement in Horse-Powers, of which the following is a specification:

Figure 1 represents a vertical central section of my improved horse-power; Fig. 2 is a horizontal section of the same.

Similar letters of reference indicate corresponding parts.

This invention relates to a new manner of connecting the driving-wheel of a horse-power with the sweeps to which the animals are attached, and has for its object, by the new connection, to increase the convenience of construction and gain or economize power. The invention consists in the interposition of inclined braces between the wheel and sweeps, as hereinafter more fully set forth.

A in the drawing represents the driving-wheel of the horse-power, mounted upon a vertical shaft, B, and gearing into a pinion, $b$, on a shaft, C, from which motion is imparted to the machinery to be actuated. The shafts B and C have their bearings in the frame-work D of the horse-power. Suitably secured to the shaft B is a socketed hub, H, into the sockets of which are secured, at their inner ends, the sweeps E E, to which the animals are hitched. The sweeps E E are connected, by means of inclined braces $a\ a$, with the under side of the wheel A, near the rim of the same, as shown. By this connection of braces the sweeps do not wholly rely, in the transmission of motion, upon their connection with the shaft, but are steadied by their connection with the outer part of the wheel. Greater reliability of the apparatus and an increase of power are the results.

Having thus described my invention, I claim and desire to secure by Letters Patent—

The sweeps E E, secured in the socketed hub H on shaft B so as to project from the diametrically-opposite sides thereof, and connected by inclined braces $a\ a\ a\ a$ with the driving-wheel, the whole constructed and operating as and for the purpose specified.

THOS. S. JOHNSON.

Witnesses:
W. C. ESKRIDGE,
C. Y. MARSHALL.